United States Patent
Shin et al.

(10) Patent No.: US 11,394,021 B2
(45) Date of Patent: Jul. 19, 2022

(54) NEGATIVE ACTIVE MATERIAL FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Changsu Shin, Yongin-si (KR); Yongseok Kim, Yongin-si (KR); Jaehou Nah, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 216 days.

(21) Appl. No.: 16/374,923

(22) Filed: Apr. 4, 2019

(65) Prior Publication Data

US 2019/0312264 A1 Oct. 10, 2019

(30) Foreign Application Priority Data

Apr. 5, 2018 (KR) .................. 10-2018-0039875

(51) Int. Cl.
*H01M 4/36* (2006.01)
*H01M 10/0525* (2010.01)
*H01M 4/587* (2010.01)
*H01M 4/38* (2006.01)
*H01M 4/02* (2006.01)

(52) U.S. Cl.
CPC .......... *H01M 4/364* (2013.01); *H01M 4/366* (2013.01); *H01M 4/386* (2013.01); *H01M 4/587* (2013.01); *H01M 10/0525* (2013.01); *H01M 2004/027* (2013.01)

(58) Field of Classification Search
CPC ...... H01M 4/364; H01M 4/366; H01M 4/386; H01M 4/587; H01M 10/0525
See application file for complete search history.

(56) References Cited

U.S. PATENT DOCUMENTS

| 2012/0088155 A1* | 4/2012 | Yushin ................. H01M 4/134 429/217 |
|---|---|---|
| 2015/0270536 A1 | 9/2015 | Kawakami et al. |
| 2016/0190552 A1 | 6/2016 | Murata et al. |
| 2016/0211514 A1 | 7/2016 | Youm |
| 2016/0344018 A1 | 11/2016 | Chiu et al. |

(Continued)

FOREIGN PATENT DOCUMENTS

| CN | 101207198 A | 6/2008 |
|---|---|---|
| CN | 105453314 A | 3/2016 |

(Continued)

OTHER PUBLICATIONS

Korean Office action dated Aug. 24, 2020.

(Continued)

*Primary Examiner* — Jimmy Vo
(74) *Attorney, Agent, or Firm* — Lee IP Law, P.C.

(57) ABSTRACT

A negative active material and a rechargeable lithium battery, the negative active material including a silicon-carbon composite, the silicon-carbon composite including crystalline carbon; amorphous carbon; and silicon nanoparticles having a needle shape, a flake shape, a sheet shape, or a combination thereof, wherein the silicon nanoparticles have a D50 particle diameter of 5 nm to 150 nm and an aspect ratio of 4 to 10.

17 Claims, 4 Drawing Sheets

(56) References Cited

U.S. PATENT DOCUMENTS

| | | | |
|---|---|---|---|
| 2016/0365567 A1 | 12/2016 | Troegel et al. | |
| 2017/0012282 A1* | 1/2017 | Kondo | H01M 4/587 |
| 2017/0047580 A1* | 2/2017 | Cho | H01M 4/38 |
| 2018/0083272 A1 | 3/2018 | Son et al. | |
| 2019/0006666 A1* | 1/2019 | Obrovac | H01M 4/134 |

FOREIGN PATENT DOCUMENTS

| | | | | |
|---|---|---|---|---|
| CN | 105981206 A | 9/2016 | | |
| CN | 107845785 A | 3/2018 | | |
| JP | 2015-179593 A | 10/2015 | | |
| JP | 2016-100225 A | 5/2016 | | |
| JP | 2018 110076 A | 7/2018 | | |
| KR | 10 2014 0085822 A | 7/2014 | | |
| KR | 10-2014-0094676 A | 7/2014 | | |
| KR | 10-2015-0015086 A | 2/2015 | | |
| KR | 10 2015 0063620 A | 6/2015 | | |
| KR | 10 2016 0088181 A | 7/2016 | | |
| KR | 10-2016-0104720 A | 9/2016 | | |
| KR | 10 2018 0031585 A | 3/2018 | | |
| WO | WO 2015 105534 A1 | 7/2015 | | |
| WO | WO 2015 114692 A1 | 8/2015 | | |
| WO | WO-2017116783 A1 * | 7/2017 | | H01M 10/0525 |

OTHER PUBLICATIONS

Korean Notice of Allowance dated Nov. 5, 2020.
Chinese Office action dated Dec. 20, 2021 and Chinese Search Report dated Dec. 6, 2021.

\* cited by examiner

NEGATIVE ACTIVE MATERIAL FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2018-0039875, filed on Apr. 5, 2018, in the Korean Intellectual Property Office, and entitled: "Negative Active Material for Rechargeable Lithium Battery and Rechargeable Lithium Battery Including the Same," is incorporated by reference herein in its entirety.

BACKGROUND

1. Field

Embodiments relate to a negative active material for a rechargeable lithium battery and a rechargeable lithium battery including the same.

2. Description of the Related Art

A rechargeable lithium battery includes positive and negative electrodes including a material that can reversibly intercalate/deintercalate lithium ions as positive and negative active materials and an organic electrolyte or a polymer electrolyte charged between the positive and negative electrodes. Herein, the positive and negative electrodes intercalate and deintercalate lithium ions and produce electrical energy through oxidation and reduction reactions.

As for a positive active material for a lithium secondary battery, a lithium-transition metal oxide capable of intercalating lithium such as $LiCoO_2$, $LiMn_2O_4$, $LiNi_{1-x}Co_xO_2$ (0<x<1), and the like has been used.

As for a negative active material for a lithium secondary battery, various carbon-based materials such as artificial graphite, natural graphite, and hard carbon capable of intercalating and deintercalating lithium ions have been used.

SUMMARY

The embodiments may be realized by providing a negative active material for a rechargeable lithium battery, including a silicon-carbon composite, the silicon-carbon composite including crystalline carbon; amorphous carbon; and silicon nanoparticles having a needle shape, a flake shape, a sheet shape, or a combination thereof, wherein the silicon nanoparticles have a D50 particle diameter of 5 nm to 150 nm and an aspect ratio of 4 to 10.

The silicon nanoparticles may have a long diameter of 50 nm to 150 nm and a short diameter of 5 nm to 37 nm.

As the D50 particle diameter of the silicon nanoparticles decreases by 1%, the aspect ratio of the silicon nanoparticles may increase by 3% to 5%.

The silicon nanoparticles may include a grain having a D50 particle diameter of 5 nm to 20 nm.

The crystalline carbon may have a flake shape or a sheet shape.

The crystalline carbon may have a D50 particle diameter of 5 μm to 10 μm.

The crystalline carbon may include artificial graphite, natural graphite, or a combination thereof.

The negative active material may have a core-shell structure composed of: a core including the silicon-carbon composite; and a shell including a carbon coating layer surrounding a surface of the core.

The carbon coating layer may include crystalline carbon, amorphous carbon, or a combination thereof.

The crystalline carbon may be included in an amount of 30 wt % to 50 wt %, the amorphous carbon may be included in an amount of 10 wt % to 40 wt %, and the silicon nanoparticles may be included in an amount of 20 wt % to 60 wt %, all wt % based on the total weight of the carbon coating layer and the silicon-carbon composite.

The carbon coating layer may have a thickness of 1 nm to 100 nm.

The embodiments may be realized by providing a rechargeable lithium battery including a negative electrode including the negative active material according to an embodiment; a positive electrode; and an electrolyte.

The silicon nanoparticles may have a long diameter of 50 nm to 150 nm and a short diameter of 5 nm to 37 nm.

The silicon nanoparticles may include a grain having a D50 particle diameter of 5 nm to 20 nm.

The crystalline carbon may have a flake shape or a sheet shape.

The crystalline carbon may have a D50 particle diameter of 5 μm to 10 μm.

The crystalline carbon may include artificial graphite, natural graphite, or a combination thereof.

The negative active material may have a core-shell structure composed of: a core including the silicon-carbon composite; and a shell including a carbon coating layer surrounding a surface of the core.

The carbon coating layer may include crystalline carbon, amorphous carbon, or a combination thereof.

The crystalline carbon may be included in an amount of 30 wt % to 50 wt %, the amorphous carbon may be included in an amount of 10 wt % to 40 wt %, and the silicon nanoparticles may be included in an amount of 20 wt % to 60 wt %, all wt % based on the total weight of the carbon coating layer and the silicon-carbon composite.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
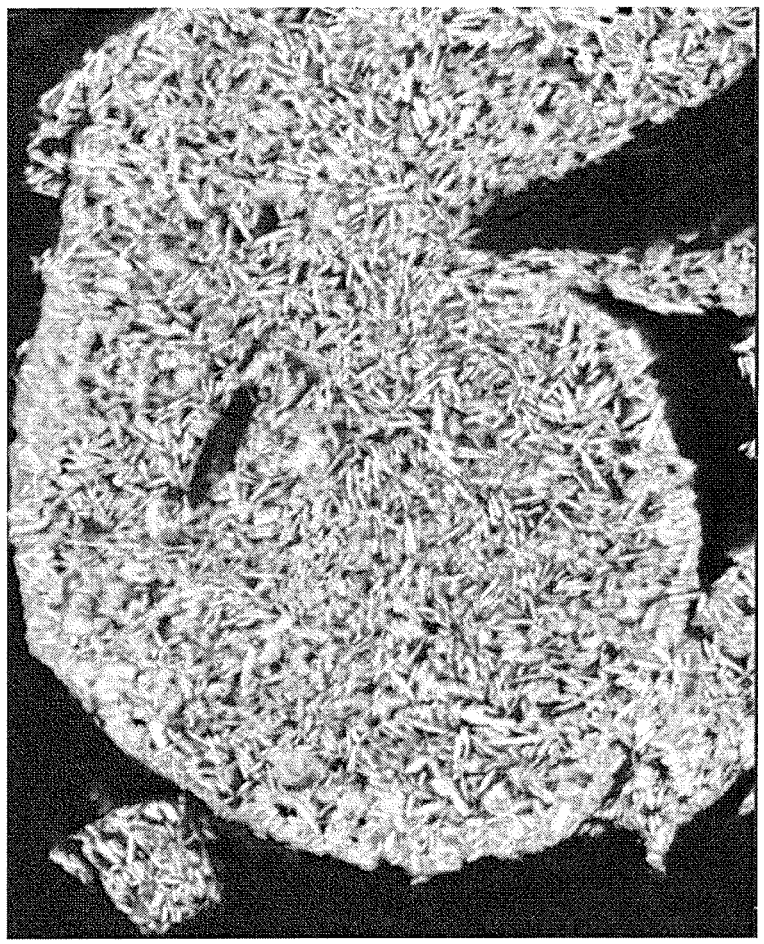
FIGS. 1 and 2 illustrate microscope images of negative electrode active materials for a rechargeable lithium battery according to embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

In order to clearly describe the present disclosure, parts which are not related to the description may be omitted.

Negative Active Material for Rechargeable Lithium Battery

A negative active material according to an embodiment may include, e.g., a silicon-carbon composite including crystalline carbon, amorphous carbon, and a silicon nanoparticle.

A negative active material according to another embodiment may have, e.g., a core-shell structure including a core (that includes a silicon-carbon composite including crystalline carbon, amorphous carbon, and a silicon nanoparticle) and an amorphous carbon layer surrounding or on a surface of the core.

Figure 2:
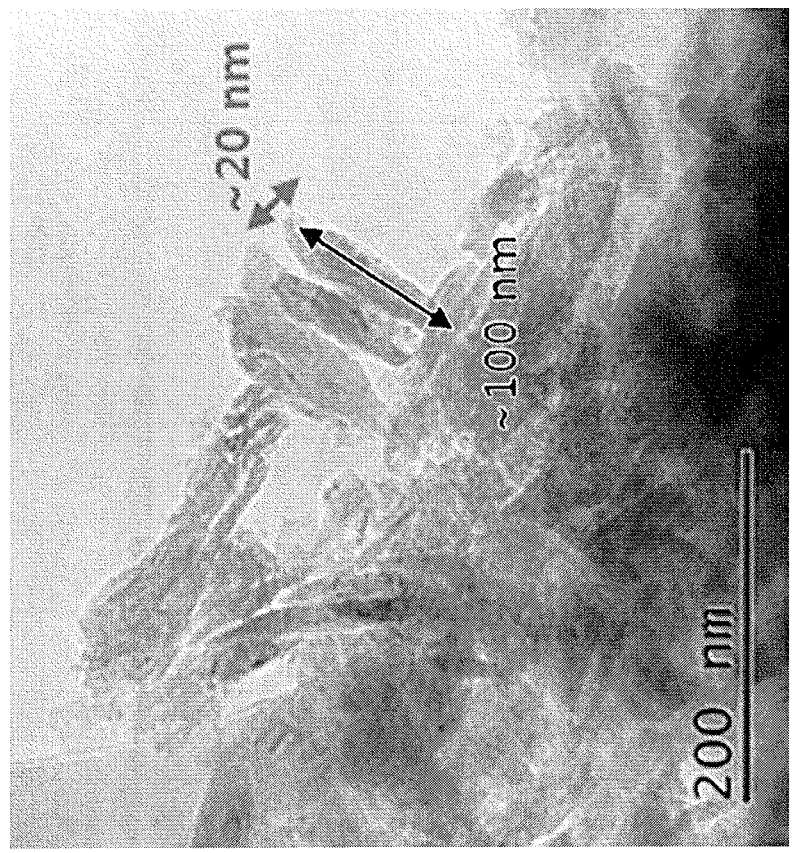

FIGS. 1 and 2 illustrate microscope images of negative electrode active materials for a rechargeable lithium battery according to embodiments taken. Referring to FIGS. 1 and 2, silicon nanoparticles according to an embodiment have, e.g., a needle-shape, a flake-shape, a sheet-shape, or a combination thereof.

Figure 3:
FIG. 3 illustrates a microscope image of a negative active material for a rechargeable lithium battery according to another embodiment.

FIG. 3 illustrates a microscope image showing a negative active material for a rechargeable lithium battery according to another embodiment. Referring to FIG. 3, a core-shell structure including a core including graphite (crystalline carbon and/or amorphous carbon) and silicon nanoparticles and an amorphous carbon coating layer surrounding the core may be seen.

In an implementation, referring to FIG. 2, the silicon nanoparticles may have an aspect ratio of greater than or equal to about 4, e.g., ranging from about 4 to about 10. When the silicon nanoparticles simultaneously have a needle-shape, a flake-shape, and a sheet-shape and an aspect ratio of about 4 to about 10, an electrode plate expansion ratio of a negative electrode may be decreased. Accordingly, a cycle-life of a battery may be improved.

Herein, the "aspect ratio" indicates a ratio of a longest distance to a shortest distance among cross sections of the silicon nanoparticles. The longest distance among the cross sections of the silicon nanoparticles may be a "long diameter" or a maximum or greatest dimension of the nanoparticle, the shortest distance among the cross sections of the silicon nanoparticles may be a "short diameter" or a minimum or shortest dimension of the nanoparticle.

In an implementation, the silicon nanoparticles may have a D50 particle diameter ranging from about 5 nm to about 150 nm, e.g., about 10 nm to about 150 nm, about 30 nm to about 150 nm, about 50 nm to about 150 nm, about 60 nm to about 100 nm, or about 80 nm to about 100 nm.

For example, the silicon nanoparticles may have the long diameter ranging from about 50 nm to about 150 nm and the short diameter ranging from about 5 nm to about 37 nm. When the silicon nanoparticles have a size within the range, an electrode plate expansion ratio of a negative electrode may be reduced, and accordingly, a cycle-life of a battery may be improved.

There is a correlation between the D50 particle diameter of the silicon nanoparticle and the aspect ratio of the silicon nanoparticle. For example, as the D50 particle diameter of the silicon nanoparticle decreases by about 1%, the aspect ratio of the silicon nanoparticle may increase by about 3% to about 5%. For example, if the D50 particle diameter of the silicon nanoparticle is decreased by 1%, the aspect ratio of the silicon nanoparticle may be increased by 4%. For example, when the D50 particle diameter of the silicon nanoparticle is decreased, the silicon nanoparticle with a relatively higher aspect ratio may be provided.

In an implementation, the silicon nanoparticles include at least one grain. For example, the silicon nanoparticles according to an embodiment may be a monocrystalline silicon nanoparticle including one grain or a polycrystalline silicon nanoparticle including a plurality of grains. In an implementation, the silicon nanoparticles may not necessarily be crystalline, e.g., but partly have a crystalline structure and partly an amorphous structure.

In an implementation, at least one grain included in the silicon nanoparticles may have a D50 particle diameter ranging from about 5 nm to about 20 nm, e.g., about 10 nm to about 20 nm, or about 15 nm to about 20 nm. When the grains of the silicon nanoparticles have a D50 particle diameter within the range, an electrode plate expansion ratio of a negative electrode may be further reduced. The D50 particle diameter is may be as a particle diameter at a 50 volume % in a cumulative size-distribution curve measured by putting the silicon nanoparticles in a particle size analyzer.

In an implementation, the crystalline carbon included in an embodiment may have a flake-shape or a sheet-shape and may include artificial graphite, natural graphite, or a combination thereof. In an implementation, the crystalline carbon may have a D50 particle diameter ranging from about 5 μm to about 10 μm. When the crystalline carbon has a similar flake-shape or sheet-shape to those of the silicon nanoparticles, the silicon nanoparticles may have a more uniform distribution, a diffusion path of lithium ions may be decreased according to the uniform distribution of particles having a similar shape, and rate capability and output characteristics of a battery may be improved.

The amorphous carbon may be soft carbon or hard carbon, mesophase pitch carbonized product or fired coke, and the like.

In an implementation, the negative active material according to an embodiment may include a silicon-carbon composite in which the aforementioned silicon nanoparticles and crystalline carbon particles are combined and agglomerated by the amorphous carbon.

According to an embodiment, when the silicon-carbon composite is regarded to have a weight of 100 wt %, the silicon nanoparticles may be included in an amount of about 35 wt % to about 45 wt %, the crystalline carbon may be included in an amount of about 35 wt % to about 45 wt %, and the amorphous carbon may be included in an amount of about 10 wt % to about 30 wt %, based on a total weight of the silicon-carbon composite.

When the silicon nanoparticles, the crystalline carbon, and the amorphous carbon are included within each aforementioned ranges, an electrode plate expansion ratio of a negative electrode may be improved, while capacity of the negative electrode is not decreased, and accordingly, a battery cycle-life may be improved.

In an implementation, the negative active material may have a core-shell structure. The negative active material having the core-shell structure may include a core in the center and a shell surrounding the surface thereof.

The core in the center of the negative active material may be a silicon-carbon composite formed by the aforementioned silicon nanoparticles, crystalline carbon, and amorphous carbon.

In an implementation, the shell includes a carbon coating layer surrounding the surface of the core. The carbon coating layer may be a crystalline carbon coating layer or an amorphous carbon coating layer. The crystalline carbon coating layer may be formed by mixing inorganic particles and crystalline carbon into a solid-phase or a liquid-phase and then, heat-treating the mixture. The amorphous carbon coating layer may be formed by coating an amorphous carbon precursor on the surface of the inorganic particles and then, heat-treating and carbonizing it.

In an implementation, the carbon coating layer may have a thickness ranging from about 1 nm to about 100 nm, e.g., about 5 nm to about 100 nm. The carbon coating layer having a thickness within the range may help suppress expansion of the silicon nanoparticles but not hinder intercalation and deintercalation of lithium ions and thus maintain battery performance.

According to an embodiment, in the negative active material having a core-shell structure for a rechargeable lithium battery, the crystalline carbon may be included in an amount of about 30 wt % to about 50 wt %, the amorphous carbon may be included in an amount of about 10 wt % to about 40 wt %, and the silicon nanoparticles may be included in an amount of about 20 wt % to about 60 wt %, all based on a total weight of the carbon coating layer and the silicon-carbon composite.

Electrode for Rechargeable Lithium Battery

In another embodiment, a rechargeable lithium battery may include a negative electrode including the negative active material for a rechargeable lithium battery, a positive electrode, and an electrolyte.

Figure 4:
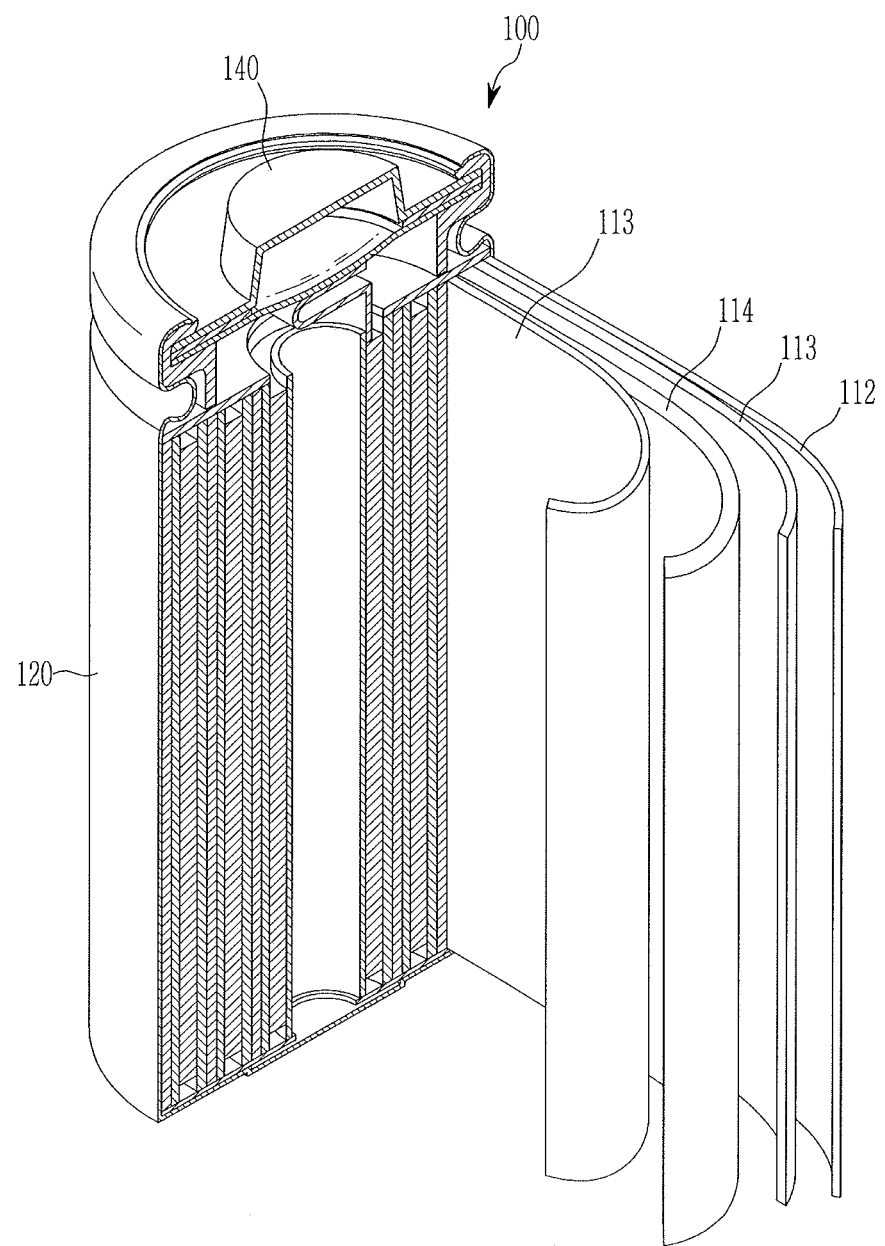
FIG. 4 illustrates a schematic view of a structure of a rechargeable lithium battery according to an embodiment.

FIG. 4 illustrates a schematic view of a structure of a rechargeable lithium battery according to an embodiment. Referring to FIG. 4, the lithium secondary battery 100 may include a battery case 120 including a negative electrode 112, a positive electrode 114, and an electrolyte impregnating a separator 113 between the positive electrode 114 and the negative electrode 112, and a sealing member 140 sealing the battery case 120.

The positive electrode 114 and the negative electrode 112 may be manufactured by mixing each active material, a binder, and a conductive material in a solvent to prepare an electrode composition and coating the electrode composition on a current collector.

The current collector may not cause chemical changes of a battery and has conductivity. The current collector may have a thickness of, e.g., about 3 μm to about 500 μm.

When the current collector is applied to a positive electrode, it may be stainless steel, aluminum, nickel, titanium, fired carbon, or aluminum or stainless steel of which the surface is treated with carbon, nickel, titanium, or silver.

When the current collector is applied to a negative electrode, it may be a copper foil, a nickel foil, a stainless steel foil, a titanium foil, a nickel foam, a copper foam, a polymer substrate coated with a conductive metal, or a combination thereof.

A negative active material used for the negative electrode 112 may include the silicon-carbon composite including crystalline carbon, amorphous carbon, and silicon nanoparticles as aforementioned. For example, the silicon nanoparticles may have a needle-shape, a flake-shape, a sheet-shape, or a combination thereof, a D50 particle diameter ranging from about 5 nm to about 150 nm, and an aspect ratio ranging from about 4 to about 10. The other details are the same as above and thus may be omitted here.

The positive electrode 114 may include a compound (a lithiated intercalation compound) capable of intercalating and deintercallating lithium as a positive active material.

The positive active material may be specifically a composite oxide of lithium and at least one metal of cobalt, manganese, nickel, and a combination thereof and specific examples thereof may be compounds represented by one of the following chemical formulae. $Li_aA_{1-b}R_bD_2$ (wherein, in the chemical formula, $0.90 \leq a \leq 1.8$ and $0 \leq b \leq 0.5$); $Li_aE_{1-b}R_bO_{2-c}D_c$ (wherein, in the chemical formula, $0.90 \leq a \leq 1.8$, $0 \leq b \leq 0.5$ and $0 \leq c \leq 0.05$); $LiE_{2-b}R_bO_{4-c}D_c$ (wherein, in the chemical formula, $0 \leq b \leq 0.5$, $0 \leq c \leq 0.05$); $Li_aNi_{1-b-c}Co_bR_cD_\alpha$ (wherein, in the chemical formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, in the chemical formula, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, in the chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the chemical formula, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, in the chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the chemical formula, $0.90 \leq a \leq 1.8$ and $0.001 \leq b \leq 0.1$); $Li_aCoG_bO_2$ (wherein, in the chemical formula, $0.90 \leq a \leq 1.8$ and $0.001 \leq b \leq 0.1$); $Li_aMnG_bO_2$ (wherein, in the chemical formula. $0.90 \leq a \leq 1.8$ and $0.001 \leq b \leq 0.1$); $Li_aMn_2G_bO_4$ (wherein, in the chemical formula, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

Herein, the positive electrode 114 and the negative electrode 112 may further include a binder or a conductive material, respectively.

The binder may include, e.g., polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material is included to provide electrode conductivity. A suitable electrically conductive material that does not cause a chemical change may be used as a conductive material. Examples of the conductive material may include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative, and the like; or a mixture thereof.

An amount of the conductive material may be about 0.1 to about 50 parts by weight, e.g., about 0.1 to about 30 parts by weight, about 0.1 to about 15 parts by weight, or about 0.1 to about 10 parts by weight, based on 100 parts by weight of the electrode composition.

The electrolyte may include a non-aqueous organic solvent and a lithium salt.

The non-aqueous organic solvent serves as a medium for transmitting ions taking part in the electrochemical reaction of a battery. The non-aqueous organic solvent may be used alone or in a mixture. When the non-aqueous organic solvent is used in a mixture, the mixture ratio may be controlled in accordance with a desirable battery performance.

The lithium salt is dissolved in a non-aqueous organic solvent, supplies lithium ions in a battery, enables a basic operation of the lithium secondary battery, and promotes transportation of the lithium ions between positive and negative electrodes. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate; LiBOB), and a combination thereof. A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The rechargeable lithium battery 100 may further include a separator 113. The separator 113 separates the negative electrode from the positive electrode and provides a transporting passage for lithium ions and may be any generally-used separator for a lithium battery. The separator may have a low resistance to transportation of electrolyte ions and an excellent impregnation for an electrolyte.

For example, the separator may include a glass fiber, polyester, Teflon, polyethylene, polypropylene, polytetrafluoroethylene (PTFE), or a combination thereof and may have a form of a non-woven fabric or a woven fabric. For example, a polyolefin-based polymer separator such as polyethylene, polypropylene, and the like may be mainly used for a lithium ion battery. In order to ensure the heat resistance or a mechanical strength, a separator coated with a ceramic component or a polymer material may be used. In an implementation, it may have a mono-layered or multi-layered structure.

Hereinbefore, the negative active material for a rechargeable lithium battery according to an embodiment and the rechargeable lithium battery including the negative active material for a rechargeable lithium battery according to another embodiment are explained. According to an embodiment, the negative active material for a rechargeable lithium battery may be capable of effectively controlling the expansion of a negative electrode including silicon and may be capable of maintaining paths of lithium ions and thus battery cycle-life of a rechargeable lithium battery including the same may be improved while maintaining battery capacity.

Hereinafter, examples and comparative examples are described. These examples, however, are not in any sense to be interpreted as limiting the scope of the disclosure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Silicon-Carbon Composite

Preparation Example 1

Crystalline carbon (graphite, GNs), Nano-Si ($D_{50}$: 100 nm) ground by using a Beads Mill (NETZSCH) for 10 to 20 hours, and amorphous carbon (soft carbon, pitch, resin, hydrocarbon, and the like) were mixed in a weight ratio of 40:40:20 and uniformly dispersed in a solvent (IPA, ETOH, and the like) by using a homogenizer. Subsequently, the dispersed mixture was spray-dried at 50 to 100° C. with a spray dryer and heat-treated at 900 to 1,000° C. in a $N_2$ furnace to coat the amorphous carbon. Then, the obtained product was ground and sieved with a 400 mesh to obtain a silicon-carbon composite having an amorphous carbon coating layer.

Preparation Example 2

A silicon-carbon composite was obtained according to the same method as Preparation Example 1 except that Nano-Si ($D_{50}$: 85 nm) obtained by fortifying the grinding condition with Beads Mill (grinding time: 20 to 30 hours) was used.

Comparative Preparation Example 1

A silicon-carbon composite was obtained according to the same method as Preparation Example 1 except that Nano-Si ($D_{50}$: 75 nm) obtained by using a laser chemical vapor deposition through a $SiH_4$ gas decomposition was used.

Comparative Preparation Example 2

A silicon-carbon composite was obtained according to the same method as Preparation Example 1 except that Nano-Si ($D_{50}$: 40 nm) obtained by using a plasma-enhanced chemical vapor deposition was used.

Comparative Preparation Example 3

A silicon-carbon composite was obtained according to the same method as Preparation Example 1 except that the silicon-carbon composite including Nano-Si was adjusted to have a $D_{50}$ of 200 nm by changing the grinding time to 8 hours with the Beads Mill (NETZSCH).

Comparative Preparation Example 4

A silicon-carbon composite was obtained according to the same method as Preparation Example 1 except that the silicon-carbon composite including Nano-Si adjusted to have a $D_{50}$ of 1,000 nm by changing the grinding time to 2 hours with the Beads Mill (NETZSCH).

Manufacture of Rechargeable Lithium Battery Cell

Example 1

96 wt % of a negative active material prepared by mixing natural graphite and the silicon-carbon composite according to Preparation Example 1 in a weight ratio of 85:15, 1 wt % of Super-P as a conductive material, 1.5 wt % of a styrene-butadiene rubber (SBR) as a binder, and 1.5 wt % of carboxylmethyl cellulose (CMC) were mixed in distilled water to prepare slurry, and the slurry was coated on a Cu foil and then, dried and compressed to manufacture a negative electrode.

94 wt % of $LiNi_{0.5}Co_{0.1}Mn_{0.2}O_2$ (NCM512, Samsung SDI Co., Ltd.), 3 wt % of Denka black as a conductive material, and 3 wt % of polyvinylidene fluoride (PVdF) as a binder were mixed in N-methyl-2-pyrrolidone to prepare slurry, and the slurry was coated on an Al foil and then, dried and compressed to manufacture a positive electrode.

The positive and negative electrodes and a separator formed of a 20 μm-thick polypropylene-polyethylene (PP-PE) composite film were inserted in a battery case, and an electrolyte solution prepared by adding $LiPF_6$ at a concentration of 1.0 M to a mixed solvent of EC:DMC:EMC in a volume ratio of 2:4:4 was inserted thereinto to manufacture a pouch cell.

Example 2

A pouch cell was manufactured according to the same method as Example 1 except that the silicon-carbon composite according to Preparation Example 2 was used instead of the silicon-carbon composite according to Preparation Example 1.

Comparative Example 1

A pouch cell was manufactured according to the same method as Example 1 except that the silicon-carbon composite according to Comparative Preparation Example 1 was used instead of the silicon-carbon composite according to Preparation Example 1.

Comparative Example 2

A pouch cell was manufactured according to the same method as Example 1 except that the silicon-carbon composite according to Comparative Preparation Example 2 was used instead of the silicon-carbon composite according to Preparation Example 1.

Comparative Example 3

A pouch cell was manufactured according to the same method as Example 1 except that the silicon-carbon composite according to Comparative Preparation Example 3 was used instead of the silicon-carbon composite according to Preparation Example 1.

Comparative Example 4

A pouch cell was manufactured according to the same method as Example 1 except that the silicon-carbon composite according to Comparative Preparation Example 4 was used instead of the silicon-carbon composite according to Preparation Example 1.

(Evaluation)

1. Evaluation of Electrode Plate Expansion Ratio

An electrode plate expansion ratio of each single layer pouch cell after performing formation at 0.1 C/0.1 C and then, 25 cycles at a 0.5 C/0.5 C rate was evaluated by calculating a ratio of an increased cell thickness in a discharge state relative to an initial cell thickness as a percentage, and the results are shown in Table 1.

2. Evaluation of Cycle-Life

Each cell capacity decrease rate of the cells was measured after completing 50 cycles by charging the cells up to 4.2 V at the same 0.5 C/0.5 C rate as measured for evaluating the electrode plate expansion ratio and discharging them down to 2.5 V, and the results are shown in Table 1.

TABLE 1

|  | Si Size (D50 particle diameter) | Grain size | Aspect ratio | Electrode plate expansion ratio (25 cycles) | Cycle-life (50 cycles) |
| --- | --- | --- | --- | --- | --- |
| Example 1 | 100 nm | 17 nm | 4-10 | 23% | 83% |
| Example 2 | 85 nm | 16 nm | 4-10 | 17% | 87% |
| Comparative Example 1 | 75 nm | 30 nm | 1-1.5 | 31% | 77% |
| Comparative Example 2 | 40 nm | 23 nm | 1-1.5 | 25% | 79% |
| Comparative Example 3 | 200 nm | 33 nm | 4-10 | 26% | 75% |
| Comparative Example 4 | 1,000 nm | 37 nm | 10-20 | 35% | 61% |

Referring to Table 1, an expansion ratio and a cycle-life of an electrode plate manufactured by using a negative active material including silicon nanoparticles having a D50 particle diameter of 5 nm to 150 nm and an aspect ratio of 4 to 10 were all improved.

By way of summation and review, demands of a battery having high energy density increasingly have required a negative active material having high theoretical capacity density. Accordingly, Si, Sn, and Ge alloyed with lithium and an oxide thereof and an alloy thereof have drawn attention.

For example, a Si-based negative active material may have a very high charge capacity and may be used in a high-capacity battery. The Si-based negative active material may expand about 300 to about 400% during the charge and discharge, and charge and discharge characteristics and cycle-life characteristics of batteries could be deteriorated.

A binder may be capable of effectively controlling expansion of the Si-based negative active material.

One or more embodiments may provide a negative active material for a rechargeable lithium battery capable of effectively controlling an expansion of the active material, and a lithium secondary battery having improved cycle-life.

DESCRIPTION OF SYMBOLS

100: rechargeable lithium battery
112: negative electrode
113: separator
114: positive electrode
120: battery case
140: sealing member Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, comprising a silicon-carbon composite, the silicon-carbon composite including:
   crystalline carbon;
   amorphous carbon; and
   silicon nanoparticles having a needle shape, a flake shape, a sheet shape, or a combination thereof,
   wherein the silicon nanoparticles have a D50 particle diameter of 5 nm to 150 nm and an aspect ratio of 4 to 10,
   wherein the silicon nanoparticles have a long diameter of 50 nm to 150 nm and a short diameter of 5 nm to 37 nm, and
   wherein the silicon nanoparticles include grains having a grain size of 5 nm to 20 nm.

2. The negative active material as claimed in claim 1, wherein as the D50 particle diameter of the silicon nanoparticles decreases by 1%, the aspect ratio of the silicon nanoparticles increases by 3% to 5%. crystalline carbon has a D50 particle diameter of 5μm to 10μm.

3. The negative active material as claimed in claim 1, wherein the crystalline carbon has a flake shape or a sheet shape.

4. The negative active material as claimed in claim 1, wherein the crystalline carbon has a D50 particle diameter of 5 μm to 10 μm.

5. The negative active material as claimed in claim 1, wherein the crystalline carbon includes artificial graphite, natural graphite, or a combination thereof.

6. The negative active material as claimed in claim 1, wherein the negative active material has a core-shell structure composed of:
   a core including the silicon-carbon composite; and
   a shell including a carbon coating layer surrounding a surface of the core.

7. The negative active material as claimed in claim 6, wherein the carbon coating layer includes crystalline carbon, amorphous carbon, or a combination thereof.

8. The negative active material as claimed in claim 7, wherein:
   the crystalline carbon is included in an amount of 30 wt % to 50 wt %,
   the amorphous carbon is included in an amount of 10 wt % to 40 wt %, and
   the silicon nanoparticles are included in an amount of 20 wt % to 60 wt %, all wt % based on the total weight of the carbon coating layer and the silicon-carbon composite.

9. The negative active material as claimed in claim 6, wherein the carbon coating layer has a thickness of 1 nm to 100 nm.

10. A rechargeable lithium battery, comprising:
    a negative electrode including the negative active material as claimed in claim 1;
    a positive electrode; and
    an electrolyte.

11. The rechargeable lithium battery as claimed in claim 10, wherein the crystalline carbon has a flake shape or a sheet shape.

12. The rechargeable lithium battery as claimed in claim 10, wherein the crystalline carbon has a D50 particle diameter of 5 μm to 10 μm.

13. The rechargeable lithium battery as claimed in claim 10, wherein the crystalline carbon includes artificial graphite, natural graphite, or a combination thereof.

14. The rechargeable lithium battery as claimed in claim 10, wherein the negative active material has a core-shell structure composed of:
    a core including the silicon-carbon composite; and
    a shell including a carbon coating layer surrounding a surface of the core.

15. The rechargeable lithium battery as claimed in claim 14, wherein the carbon coating layer includes crystalline carbon, amorphous carbon, or a combination thereof.

16. The rechargeable lithium battery as claimed in claim 15, wherein:
    the crystalline carbon is included in an amount of 30 wt % to 50 wt %,
    the amorphous carbon is included in an amount of 10 wt % to 40 wt %, and
    the silicon nanoparticles are included in an amount of 20 wt % to 60 wt %, all wt % based on the total weight of the carbon coating layer and the silicon-carbon composite.

17. The negative active material as claimed in claim 1, wherein the silicon nanoparticles have an oblong shape.

* * * * *